US008684624B2

(12) United States Patent
Slayne

(10) Patent No.: US 8,684,624 B2
(45) Date of Patent: Apr. 1, 2014

(54) TOLERANCE RING

(75) Inventor: Andrew Robert Slayne, Bristol (GB)

(73) Assignee: Saint-Gobain Performance Plastics Rencol Limited, Coventry (GB)

( * ) Notice: Subject to any disclaimer, the term of this patent is extended or adjusted under 35 U.S.C. 154(b) by 300 days.

(21) Appl. No.: 12/491,355

(22) Filed: Jun. 25, 2009

(65) Prior Publication Data

US 2010/0003076 A1 Jan. 7, 2010

Related U.S. Application Data

(60) Provisional application No. 61/077,284, filed on Jul. 1, 2008.

(51) Int. Cl.
*F16D 1/00* (2006.01)

(52) U.S. Cl.
USPC .......... 403/365

(58) Field of Classification Search
USPC .......... 403/365, 367, 371, 372; 411/520, 521; 384/535, 581
See application file for complete search history.

(56) References Cited

U.S. PATENT DOCUMENTS 1,662,544 A * 3/1928 Solenberger .......... 277/485
2,325,616 A * 7/1943 Landweber .......... 114/244
2,931,412 A 4/1960 Wing
3,061,386 A * 10/1962 Dix et al. .......... 384/535
3,142,887 A 8/1964 Hulck et al.
3,197,243 A 7/1965 Brenneke
3,522,644 A * 8/1970 Cavagnero .......... 29/898.066
4,097,756 A * 6/1978 Gee .......... 310/155
4,222,246 A * 9/1980 Rongley .......... 464/30
4,286,894 A * 9/1981 Rongley .......... 403/372
5,496,216 A * 3/1996 Rohrle et al. .......... 464/66.1
6,454,201 B1 * 9/2002 Strobel et al. .......... 242/379.1
6,480,363 B1 * 11/2002 Prater .......... 360/265.7
6,485,186 B2 * 11/2002 Wood et al. .......... 384/499
6,755,746 B2 * 6/2004 Barnley et al. .......... 464/162
2006/0230902 A1 * 10/2006 Oberheim .......... 83/522.15
2007/0096572 A1 * 5/2007 Watkins et al. .......... 310/90
2008/0043374 A1 * 2/2008 Hanrahan et al. .......... 360/265.6

FOREIGN PATENT DOCUMENTS

DE 2063266 A1 6/1971
DE 29910021 U1 9/1999
EP 1568554 A1 8/2005
EP 1693635 A1 * 8/2006 .......... B65G 39/02
WO 94/29609 A1 12/1994
WO 2008/021890 A2 2/2008

* cited by examiner

*Primary Examiner* — Victor MacArthur
*Assistant Examiner* — James Linford
(74) *Attorney, Agent, or Firm* — Abel Law Group, LLP; Chi Suk Kim

(57) ABSTRACT

A tolerance ring includes a curved strip having first and second ends. Additionally, the tolerance ring includes a plurality of projections formed on the curved strip, and a physical connection between the first and second ends such that the curved strip forms a closed loop.

9 Claims, 3 Drawing Sheets

100 110 116 26 10 28 124 102 112 120 16 122 114 24 12 126 14

TOLERANCE RING

FIELD OF THE DISCLOSURE

This disclosure is concerned with tolerance rings for assembly between an inner component and an outer component, and methods of making and pre-assembling such rings.

BACKGROUND

Typically, a tolerance ring comprises a strip of resilient material, e.g. a metal such as spring steel, which is rolled so that the ends are brought towards one another to form a ring split through its circumference. The split can allow the ring to conform to the shape of the shaft and/or bore during assembly and, in some cases, in service. One or more lines of projections can be formed around the ring, the projections extending radially inwardly and/or outwardly from the ring. The projections can be formations such as corrugations, ridges, waves, dimples or spring fingers.

In use, the projections can be compressed between the walls of the shaft and bore. Each projection can act like a spring and exerts a radial force against the components, thereby providing an interference fit between them.

Tolerance rings may facilitate assembly since they can compensate for manufacturing tolerances in the shaft and/or bore. They can also have other benefits, such as compensating for shape and/or dimension changes caused by bore and shaft materials having different thermal expansion properties. In addition, tolerance rings can compensate for angular and radial misalignment of the shaft and bore, and can be used to reduce or control vibration or resonance effects. When an excessive torque is applied to the shaft, a tolerance ring can also allow predictable and repeatable slip to occur.

However, split ring tolerance rings can be difficult to store, transport and handle loose because they tend to become interlocked and tangled up, as illustrated in FIG. 1 of the accompanying drawings. This may be a problem for end users, who may have to manually separate the rings.

SUMMARY

In an embodiment, a split ring tolerance ring, at least during transportation and storage, can have its free ends physically connected to form a closed loop. Thus, separation of the free ends during storage and transportation and the consequential risk of interlocking and tangling may be avoided.

In a first aspect of a tolerance ring can include a curved strip of material having a plurality of projections formed therein, whose free ends are physically connected to form a closed loop.

Thus, opposite ends of a strip of material can be brought towards one another so that the strip forms a curve or open loop. The ends of the strip can be connected together physically by any suitable means so that the open loop formed by the strip is closed. Accordingly, when a plurality of tolerance rings according to the first aspect are stored or transported together loose in a container the tolerance rings may not become interlocked and tangled. The rings can therefore be retrieved and handled easily by the end user. In particular, the end user need not tug at the tolerance rings to separate them, and so there can be a consequential reduced risk of damage to the rings.

The free ends of the strip may be separated by a gap or may overlap one another at an end portion. The strip can be made from a resilient material such as carbon steel, stainless steel, inconel, monel, incalloy, phynox, copper-beryllium, or any other suitable material. The projections can be formed in the strip by a press tool and can be formations such as corrugations, ridges, waves, dimples or spring fingers.

In an embodiment, the physical connection between the free ends of the strip can be adapted to be breakable during radial expansion or contraction of the ring. That is, the physical connection can be temporary or non-permanent. Such radial (and circumferential) expansion or contraction can take place, for example, during pre-assembly of the tolerance ring onto a shaft or into a bore. For example, radial expansion of the ring, and consequential tension across the physical connection between the free ends of the strip, can be caused when the pre-assembly internal diameter of the ring is less than the outer diameter of the shaft.

This radial expansion or contraction can cause tensile or compressive stresses around the closed loop which in turn can cause the physical connection to be broken so that the free ends of the strip are separated. In this way the tolerance ring can operate in the same way as a known tolerance ring, with the free ends moving towards or away from one another in order to allow for radial expansion and contraction of the ring during assembly and/or during service.

In an alternate embodiment, the physical connection can be retained in use. To permit radial expansion/contraction during mounting the strip can include an expansion region. The expansion region can act as an expansion joint; it can deform to provide circumferential expansion or contraction corresponding to the radial expansion or contraction of the ring caused during mounting. In this way the expansion region can perform the role that the gap or overlap between the free ends of the strip performs in known tolerance rings: it can enable the circumference of the tolerance ring to grow or shrink so that it can conform to the shape of a shaft or bore.

The expansion region can extend across the strip, i.e. across the width of the strip. It can extend all the way across the strip, i.e. along the axial extent of the ring. It can be press-formed in the strip, in the same way as the projections. In particular, the expansion region can comprise one or more corrugations. Each corrugation may be a sharp fold, like those of a fan or concertina, or a gentle fold or wave. The corrugation or corrugations can be press-formed in the strip. They can each extend fully across the strip. That is, the corrugations can be folds which are as long as the strip is wide. The expansion region can be located opposite the weld.

In an embodiment, the physical connection between the free ends of the strip can comprise a weld. The weld can be a tack weld, e.g. a spot weld, designed to be breakable during radial expansion or contraction of the ring. In such embodiments the weld may not extend all the way across the strip, but may instead be small in relation to the width of the strip. The weld can connect one or more overlapping regions of the strip. Each overlapping region can be unformed (i.e. free of projections). The overlapping regions can include one or more finger projections from one end of the strip which are arranged to overlie the other end of the strip when it is curled into a pre-use configuration.

Alternatively, the weld can be a weld bead. The weld bead can extend across the width of the strip; that is, the weld bead can be as long as the strip is wide. Such a weld bead can be retained in use, so that the free ends of the strip remain physically connected to one another when the tolerance ring is assembled between a shaft and a bore.

In another aspect, a method of manufacturing a tolerance ring includes: forming a plurality of projections in a strip of material, bending the strip into a curve, and physically connecting the free ends of the strip to form a closed loop.

In an embodiment, forming the projections can be carried out using any suitable forming method. For example, the projections can be press-formed or roll-formed. The projections can be formed, for example, by indenting the strip to form corrugations, ridges, waves or dimples, or by piercing the strip to form spring fingers.

The projections can each extend from the strip in the same direction. Thus, in use the projections can extend from the strip in order to frictionally engage a surface of one of an inner component and an outer component. The other of the inner and outer component can thus be engaged by an unformed part of the strip. For example, in one embodiment the projections can engage the external surface of a shaft and the unformed region can engage the inwardly facing surface of a bore (e.g. cavity in a housing). Alternatively, the projections can extend outwardly from the strip in order to frictionally engage the inwardly facing surface of a bore and the unformed region can contact the shaft.

Bending the strip into a curve can be achieved using any suitable method. For example, the strip can be rolled into a curve. The radial expansion or contraction of the ring comprises radial expansion or contraction of the unformed surface of the ring. That is, a change in radius of an arc or loop formed by the unformed surface of the ring.

Physically connecting the free ends of the strip can comprise forming a physical connection which is arranged to be breakable during radial expansion or contraction of the ring. The step of press-forming the strip can include forming an expansion region in the strip, the expansion region being arranged to permit radial expansion or contraction of the ring. In such embodiments the physical connection can be retained during use of the tolerance ring. That is, the physical connection can be arranged to be permanent.

The step of physically connecting the free ends of the strip can comprise welding the free ends to one another. The weld can be a tack weld designed to be temporary and broken when the ring is pre-assembled to a bore or shaft. Alternatively, the weld can be a weld bead and can extend across the strip, e.g. all the way across the strip.

In yet another aspect, a method of pre-assembling a tolerance ring to a shaft or bore can include the step of either mounting the tolerance ring on the shaft so that the tolerance ring radially expands or mounting the tolerance ring in the bore so that the tolerance ring radially contracts. The tolerance ring can include a curved strip of material having a plurality of projections press-formed therein, whose free ends are physically connected to form a closed loop.

The tolerance ring can be adapted to be assembled between a shaft and a bore. Initially, though, the ring can be mounted on the shaft or in the bore to form a pre-assembly. The remaining component can be then assembled to the pre-assembly to form the final assembly. When the ring is pre-assembled to the shaft, the outer diameter of the shaft can be greater than the internal diameter of the ring (e.g. the diameter of the unformed surface), so that the ring radially expands during pre-assembly. Similarly, when the ring is pre-assembled to the bore, the internal diameter of the bore can be smaller than the external diameter of the ring (e.g. the diameter of the unformed surface), so that the ring radially contracts during pre-assembly.

The ring can be pre-assembled to the shaft so that the projections extend radially outwardly from it, i.e. so that the unformed surface is in contact with the shaft. Alternatively, the ring can be pre-assembled to the bore so that the projections extend radially inwardly from it, i.e. so that the unformed surface is in contact with the bore.

Radial expansion or contraction of the ring can cause breakage of the physical connection between the free ends of the strip. The ring can have an expansion region which permits the radial expansion or contraction of the ring. In such embodiments the physical connection can be retained in use. That is, the physical connection can be arranged to permanently connect the free ends of the strip together.

Preferred or optional features described in relation to the various aspects of the invention may be applied, either singly or in combination, to any of the aspects.

BRIEF DESCRIPTION OF THE DRAWINGS

By way of example, embodiments of the present disclosure will now be described in detail with reference to the accompanying drawings, in which.

DETAILED DESCRIPTION

Figure 1:
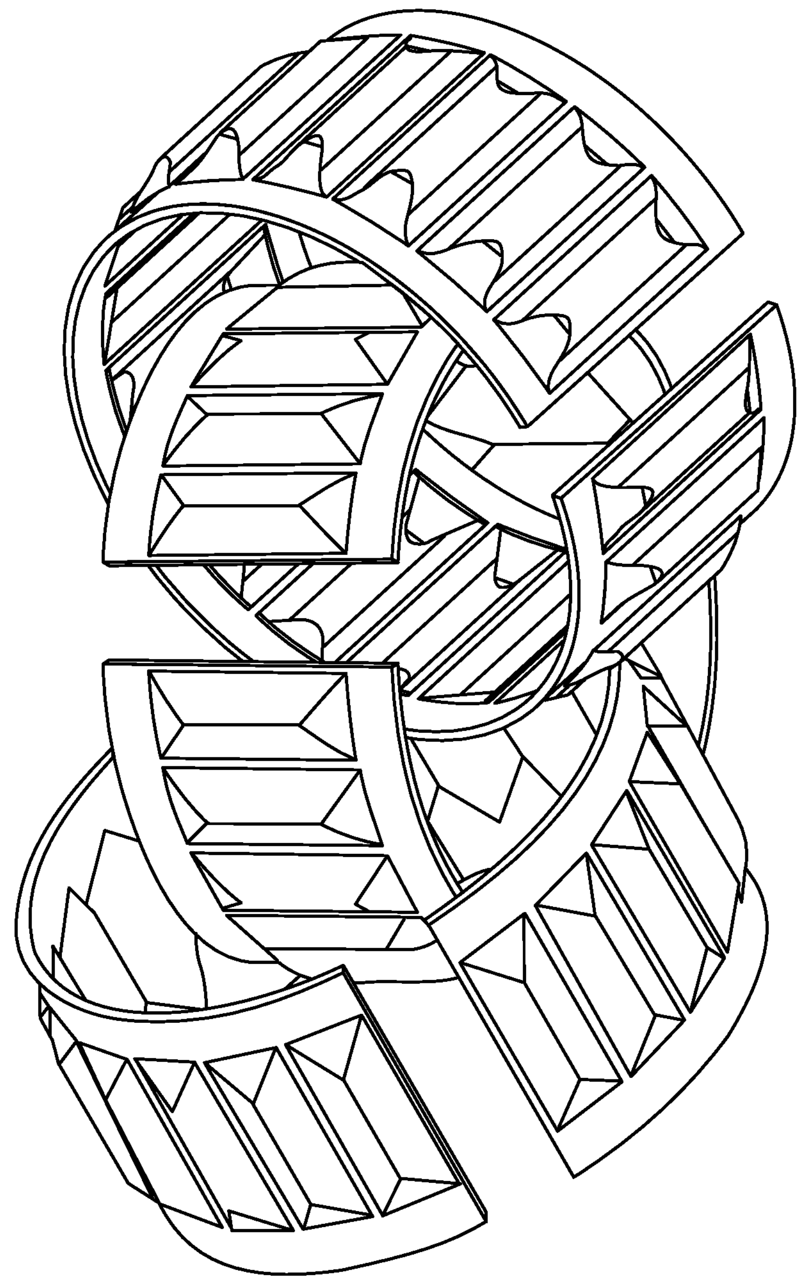
FIG. 1 shows a plurality of interlinked conventional tolerance rings.
Figure 2:
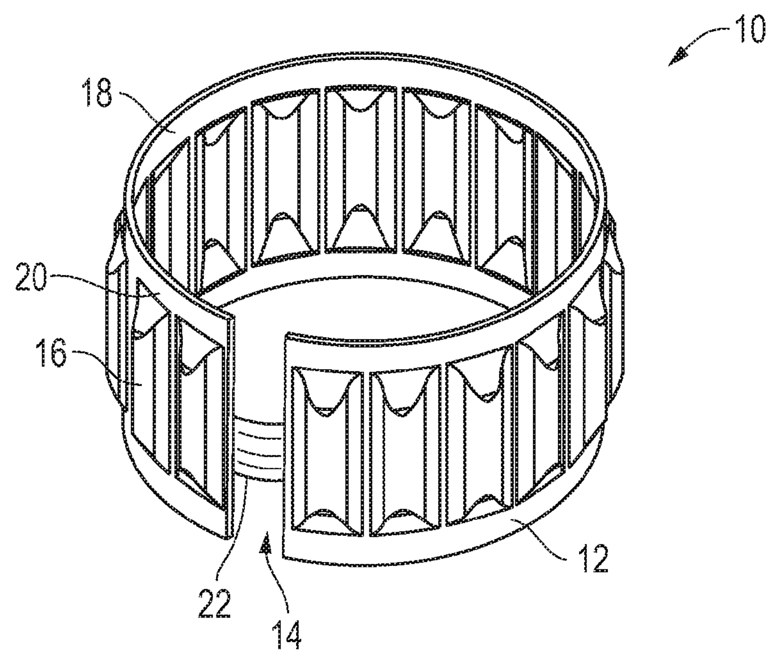
FIG. 2 shows a tolerance ring according to a first embodiment of the present invention.
Figure 3:
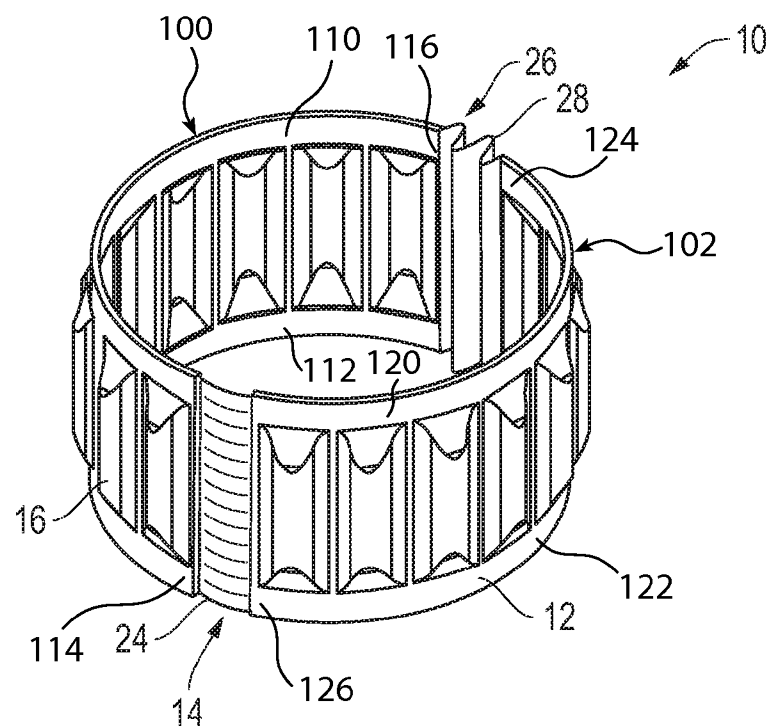
FIG. 3 shows a tolerance ring according to a second embodiment of the present invention.

The tolerance rings 10 illustrated in FIGS. 2 and 3 can each be formed from a rectangular strip, or band, 12 rolled into an open ring shape or loop. The ends of the strip 12 may not meet one another, but can be separated by a gap 14 which splits the ring 10 across its circumference, i.e. across the width of the strip 12. In other embodiments the ends of the strip 12 can overlap so that, when unconnected, they are able to slide relative to one another in response to changes in diameter of the ring 10. Each strip 12 can be made from a resilient material such as spring steel, and can have a line of projections 16 press-formed along its length. Thus, the strip 12 can have an unformed surface 22 and a formed surface 24.

The projections 16 can extend radially outwardly from the ring 10 so that they contact the walls of the bore when the ring 10 is assembled in the annular space between a shaft and bore (not shown). In use, the projections 16 can be compressed between the walls of the shaft and bore. Each projection 16 can act like a spring and exerts a radial force against the components, thereby providing an interference fit between them.

Although the illustrated embodiments show a tolerance ring 10 in which the projections 16 extend radially outwardly so that the unformed surface 18 contacts the shaft and the formed surface 20 contacts the bore, in an alternate embodiment the projections can extend radially inwardly.

In the embodiment of FIG. 2 the gap 14 can be bridged by a breakable weld 22, such as a tack weld or spot weld. In practice this may be achieved by providing an overlap portion (see FIGS. 4A-4C for examples). The overlap portion can be one or more tabs of unformed material attached to (or integrally formed with) one end of the strip 12. It can be arranged to overlap with and be weldable to an unformed region at the other end of the strip 12 when the strip is curled ready for use. In embodiments in which the free ends of the strip 12 overlap one another the weld can be typically positioned across the outermost free end. One or both of the free ends may have a plain (i.e. unformed) region with no projections in order to enable face-to-face mating of the free ends.

The ring 10 shown in FIG. 2 can be designed to be either larger in external diameter than the internal diameter of the bore into which it is to be assembled or smaller in internal diameter than the external diameter of the shaft onto which it is to be assembled. Thus, when the ring 10 is pre-assembled around a shaft or within a bore the ring 10 can be deformed either by radial expansion or radial contraction. This deformation can cause either tensile or compressive strains to be applied to the weld 22 so that it breaks. Accordingly, after assembly the ring 10 can perform in exactly the same way as a conventional tolerance ring since the break or split between the free ends of the strip 12 is reinstated. This break or split allows the ring 10 to conform to the shape of the shaft and/or bore to which it is assembled. The portions of the weld 22 remaining on the free ends of the strip 12 after breakage of the weld 22 can remain attached thereto after assembly of the ring 10 between a shaft and bore.

In the embodiment of FIG. 3, on the other hand, the gap 14 can be permanently bridged by a weld bead 24. In order to enable the ring 10 to conform to the shape of the shaft and/or bore to which it is assembled, the ring 10 can have an expansion joint 26 opposite the gap 14. The expansion joint 26 can comprise a series of corrugations 28 which deform in order to provide a certain degree of circumferential expansion and contraction. In this embodiment, the expansion joint 26 can include a plurality of folds, but an expansion joint having only one fold may also be used. Thus, the ring 10 can be able to conform to the shape of the shaft and bore between which it is assembled, even though the gap 14 is welded closed. For example, if the pre-assembly outer diameter of the tolerance ring 10 is greater than the internal diameter of the bore, the corrugations 28 will fold towards one another so the outer diameter (and circumference) of the ring 10 can be correspondingly reduced.

Still referring to FIG. 3, a tolerance ring can include a curved strip. The curved strip can include a first portion 100 having a first unformed axial end 110, a second unformed axial end 112, a first circumferential end 114 and a second circumferential end 116. The curved strip can include a plurality of projections 16 protruding radially from the first portion of the curved strip between the first and second circumferential ends 114, 116 and between the first and second unformed axial ends 110, 112. The curved strip can further include a second portion 102 having a third unformed axial end 120, a fourth unformed axial end 122, a third circumferential end 124 and a fourth circumferential end 126, a plurality of projections 16 protruding radially from the second portion of the curved strip between the third and fourth circumferential ends 124, 126 and between the third and fourth unformed axial ends 120, 122. An expansion region 26 can be formed in the curved strip between the second and third circumferential ends 116, 124 to provide circumferential expansion and contraction of the curved strip between only the second and third circumferential ends 116, 124. In an embodiment, the expansion region is circumferentially spaced apart from the first and fourth circumferential ends 114, 126. A physical connection 14 can be formed between the first and fourth circumferential ends 114, 126 such that the curved strip forms a closed loop. The physical connection can be a weld.

Figure 4A:
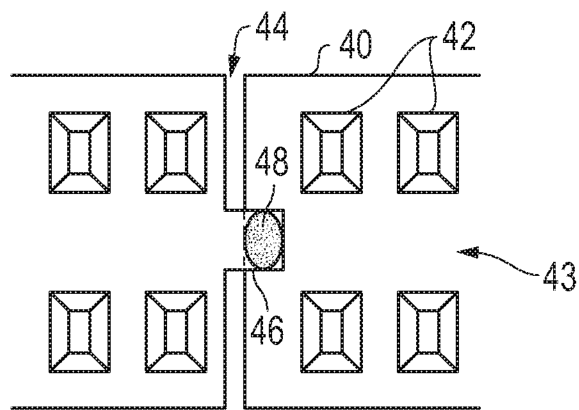
FIGS. 4A, 4B and 4C show schematically three weld configurations for use with the invention.
Figure 4B:
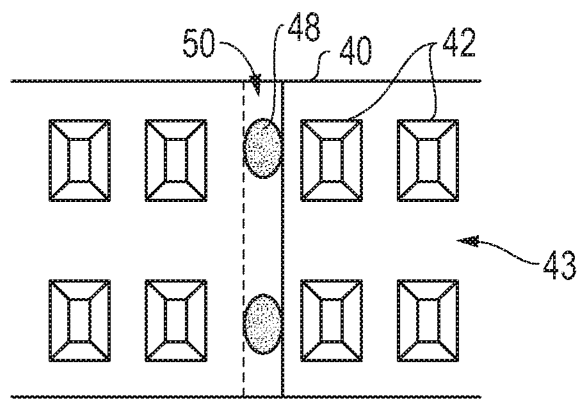
Figure 4C:
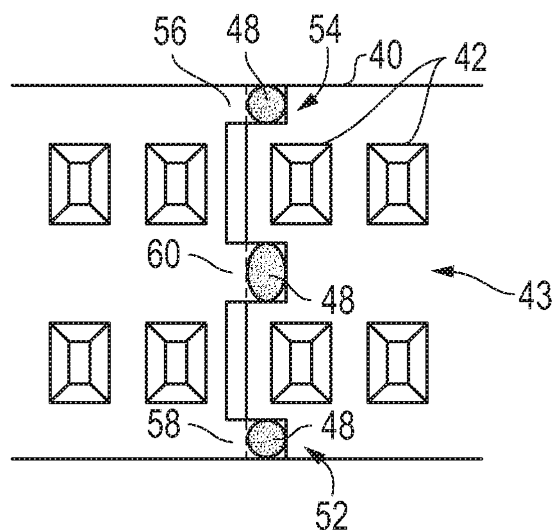

FIGS. 4A to 4C show three examples of weld arrangements.

In FIG. 4A the curved strip of material 40 (shown flat in the drawings for convenience) can have a plurality of projections 42 can be formed therein. The projections 42 are formed in two circumferential rows separated by an unformed region 43. When the strip is in a pre-use position, i.e. after curling but before mounting on a component, the ends of the strip 40 can be separated for most of their axial length by an axial gap 44. However, one end of the strip 40 can have a central circumferential tab 46 which acts as an overlap portion. The tab 46 can be cut out of an unformed end of the strip. The tab 46 can be unformed and aligned with the unformed region 43 between the projections so that it overlies part of the other end when the strip is in the pre-use position. A weld 48 can attach the overlapping parts to each other to provide a physical connection between the ends of the strip 40 to form an unbroken ring.

FIG. 4B shows a similar strip 40 where the whole axial extent of an unformed end 50 of the strip overlaps with the other end. In this embodiment two axially separated spot welds 48 can provide the physical connection. An advantage of this arrangement is that it is only necessary to position accurately the welding equipment and strip in one dimension to achieve a useful weld.

FIG. 4C shows another similar strip 40 where there are three tabs 56, 58, 60 extending from one end of the strip 40. A weld 48 can be provided where each tab 56, 58, 60 overlaps with the other end of the strip so that each tab can perform a similar function to the tab 46 discussed with reference to FIG. 4A. Two of the tabs 56, 58 can be provided at the axial edges of the strip, where they can be aligned with unformed regions 52, 54 which can run along the top and bottom edges of the strip 40. The third tab 60 can be located centrally to be aligned with the unformed region 43 between the sets of projections. An advantage of this arrangement is that the welds can be provided on either side of the final projections at the end of the strip.

What is claimed is:

1. A tolerance ring comprising:

a curved strip comprising:

a first portion having a first unformed axial end, a second unformed axial end, a first circumferential end and a second circumferential end, a plurality of projections protruding radially from the first portion of the curved strip between the first and second circumferential ends and between the first and second unformed axial ends, wherein each of the plurality of projections is spaced apart from the first and second axial ends of the curved strip;

a second portion having a third unformed axial end, a fourth unformed axial end, a third circumferential end and a fourth circumferential end, a plurality of projections protruding radially from the second portion of the curved strip between the third and fourth circumferential ends and between the third and fourth unformed axial ends, wherein each of the plurality of projections is spaced apart from the first and second axial ends of the curved strip;

an expansion region formed in the curved strip between the second and third circumferential ends to provide circumferential expansion and contraction of the curved strip between only the second and third circumferential ends, wherein the expansion region comprises a corrugation, the corrugation extending along the entire axial length of the expansion region; and a physical connection between the first and fourth circumferential ends such that the curved strip forms a closed loop, wherein the physical connection comprises a weld.

2. The tolerance ring of claim 1, wherein the expansion region extends along the axial extent of the tolerance ring.

3. The tolerance ring of claim 1, wherein the expansion region is located opposite the physical connection.

4. The tolerance ring of claim 1, wherein the expansion region includes at least one corrugation.

5. The tolerance ring of claim 4, wherein each of the at least one corrugation extends fully across the strip.

6. The tolerance ring of claim 4, wherein the at least one corrugation is limited to a circumferential length between the second and third unformed ends.

7. The tolerance ring of claim 1, wherein each unformed axial end on the first portion of the curved strip spans an entire circumferential length of the first portion, each unformed axial end on the second portion of the curved strip spans an entire circumferential length of the second portion, and each unformed axial end is continuous and free of projections.

8. The tolerance ring of claim 1, wherein each of the plurality of projections extends radially outward.

9. The tolerance ring of claim 1, wherein each of the plurality of projections extends radially inward.

* * * * *

UNITED STATES PATENT AND TRADEMARK OFFICE

CERTIFICATE OF CORRECTION

PATENT NO. : 8,684,624 B2
APPLICATION NO. : 12/491355
DATED : April 1, 2014
INVENTOR(S) : Andrew Robert Slayne It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 406 days.

Signed and Sealed this
Thirtieth Day of May, 2017

Michelle K. Lee

Michelle K. Lee
*Director of the United States Patent and Trademark Office*